(12) United States Patent
Lacoss-Arnold et al.

(10) Patent No.: US 11,276,067 B2
(45) Date of Patent: *Mar. 15, 2022

(54) SYSTEMS AND METHODS FOR DETECTING COMPROMISED AUTOMATED TELLER MACHINES

(71) Applicant: MASTERCARD INTERNATIONAL INCORPORATED, Purchase, NY (US)

(72) Inventors: Jason J. Lacoss-Arnold, St. Louis, MO (US); Michael Gillpatrick, Stevensville, MT (US); Krista Penny Tedder, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,210

(22) Filed: Aug. 12, 2019

(65) Prior Publication Data

US 2019/0362356 A1 Nov. 28, 2019

Related U.S. Application Data (63) Continuation of application No. 14/642,515, filed on Mar. 9, 2015, now Pat. No. 10,380,593.

(Continued)

(51) Int. Cl.
  *G06Q 20/40* (2012.01)
  *G06Q 20/10* (2012.01)
  *G07F 19/00* (2006.01)

(52) U.S. Cl.
  CPC ..... *G06Q 20/4016* (2013.01); *G06Q 20/1085* (2013.01); *G06Q 20/405* (2013.01); *G07F 19/207* (2013.01)

(58) Field of Classification Search
  CPC ............ G06Q 20/4016; G06Q 20/405; G06Q 20/1085; G07F 19/207
  See application file for complete search history.

(56) References Cited

U.S. PATENT DOCUMENTS

| 5,491,791 | A | * | 2/1996 | Glowny | ............... G06F 11/0709 714/26 |
|---|---|---|---|---|---|
| 5,884,289 | A | | 3/1999 | Anderson et al. | |

(Continued)

FOREIGN PATENT DOCUMENTS

| GB | 2484552 | * | 4/2012 | ............. G07F 19/00 |
|---|---|---|---|---|
| GB | 2484552 | * | 10/2020 | ............. G07F 19/00 |
| WO | WO-2015005877 A1 | * | 1/2015 | ............ G07F 19/209 |

OTHER PUBLICATIONS

Schwartz, Mathew J.: Malware Attack Drain Russian ATMs, Oct. 8, 2014, Bank Info Security, pp. 1-6 (Year: 2014).*

(Continued)

*Primary Examiner* — Bijendra K Shrestha
(74) *Attorney, Agent, or Firm* — Armstrong Teasdale LLP (57) ABSTRACT

A computer-implemented method for detecting compromised automated teller machines is provided. The method includes receiving activity data from an ATM, activity data including user input data and machine data, wherein user input data includes instructions input by a user at the ATM during a transaction, and wherein machine data is associated with processes performed by the ATM; storing operating parameter rules in the memory, the operating parameter rules configured to indicate whether the received activity data is within a normal activity range for the ATM; applying the received activity data to the operating parameter rules; generating an activity score for the ATM based on the applying, wherein the activity score is configured to indicate (Continued)

a likelihood that the ATM is compromised; and initiating a response based on the activity score.

17 Claims, 7 Drawing Sheets

Related U.S. Application Data (60) Provisional application No. 62/077,658, filed on Nov. 10, 2014.

(56) References Cited

U.S. PATENT DOCUMENTS

| | | | | |
|---|---|---|---|---|
| 6,094,643 | A * | 7/2000 | Anderson | G06Q 20/04 |
| | | | | 235/379 |
| 6,615,166 | B1 * | 9/2003 | Guheen | G06Q 10/06 |
| | | | | 703/27 |
| 7,313,545 | B2 * | 12/2007 | Degen | G06Q 20/10 |
| | | | | 235/380 |
| 7,500,599 | B2 * | 3/2009 | Swift | G06Q 20/04 |
| | | | | 235/379 |
| 8,342,395 | B1 * | 1/2013 | Muschellack | G06Q 20/1085 |
| | | | | 235/379 |
| 8,601,242 | B2 | 12/2013 | Fryman et al. | |
| 8,606,841 | B2 | 12/2013 | Kapoor et al. | |
| 8,793,438 | B2 | 7/2014 | McAuley et al. | |
| 8,943,306 | B2 | 1/2015 | Martin et al. | |
| 8,943,592 | B1 | 1/2015 | Mirski et al. | |
| 8,949,458 | B1 | 2/2015 | Rijsman | |
| 8,949,946 | B2 | 2/2015 | Worrall et al. | |
| 9,652,772 | B1 * | 5/2017 | Eyges | G06Q 20/4016 |
| 2004/0050927 | A1 | 3/2004 | Nozaki et al. | |
| 2006/0169764 | A1 | 8/2006 | Ross et al. | |
| 2008/0121692 | A1 | 5/2008 | MacPhail et al. | |
| 2008/0195540 | A1 | 8/2008 | Gee et al. | |
| 2009/0057395 | A1 | 3/2009 | He et al. | |
| 2009/0271343 | A1 * | 10/2009 | Vaiciulis | G06Q 40/00 |
| | | | | 706/21 |
| 2010/0169192 | A1 | 7/2010 | Zoldi et al. | |
| 2010/0287099 | A1 * | 11/2010 | Liu | G06Q 20/4016 |
| | | | | 705/44 |
| 2010/0293417 | A1 | 11/2010 | Kamuf | |
| 2011/0055074 | A1 * | 3/2011 | Chen | G06Q 20/4016 |
| | | | | 705/39 |
| 2011/0131122 | A1 | 6/2011 | Griffin et al. | |
| 2012/0004948 | A1 * | 1/2012 | Taintor | G06Q 30/0206 |
| | | | | 705/7.29 |
| 2012/0317013 | A1 * | 12/2012 | Luk | G06Q 20/4016 |
| | | | | 705/38 |
| 2013/0018796 | A1 * | 1/2013 | Kolhatkar | G06Q 20/28 |
| | | | | 705/44 |
| 2014/0151449 | A1 | 6/2014 | Jenkins et al. | |
| 2014/0279527 | A1 * | 9/2014 | Duke | G06Q 20/4016 |
| | | | | 705/44 |
| 2015/0278818 | A1 | 10/2015 | Horgan et al. | |

OTHER PUBLICATIONS

Cluckey, Suzanne: ATM Networks at risk of cyber attack, FEIEC warns, Apr. 3, 2014, atm marketplace, pp. 1-4 (Year: 2014).*
Diebold, Incorporated: ATM Fraud and Security, White Paper, 2006, pp. 1-12 (Year: 2006).*

* cited by examiner

SYSTEMS AND METHODS FOR DETECTING COMPROMISED AUTOMATED TELLER MACHINES

CROSS-REFERENCE TO RELATED APPLICATIONS

This application is a continuation of and claims the benefit of U.S. patent application Ser. No. 14/642,515, filed Mar. 9, 2015, which claims priority to U.S. Provisional Patent Application Ser. No. 62/077,658, filed Nov. 10, 2014, both of which are incorporated herein by reference in their entirety.

BACKGROUND

The field of the disclosure relates generally to monitoring automated teller machines (ATMs) and, more particularly, to collecting activity data from an ATM and detecting, at least partially from the collected activity data, whether the ATM is compromised.

ATMs serve many functions for consumers, who may use transaction cards to initiate transaction at ATMs. Some known ATM transactions include cash withdrawals from a cardholder account, payment of bills and taxes, accessing bank statements, cash advances on pay statements, check processing, payment of credit-card balances, account transfers, and foreign-currency deposits. However, as the capabilities of ATMs continue to advance, the risk of fraud and illegal use of ATMs remains a concern. Criminals may be able to use hardware and/or software to "hack" into an ATM, at which point these criminals and/or their agents may be able to manipulate the cash output of the ATM and/or access confidential information of the ATM users. It would be desirable to have a system and method configured to collect activity data from an ATM, analyze the activity data, and determine based at least partially on the activity data whether the ATM is compromised.

BRIEF DESCRIPTION OF THE DISCLOSURE

In one aspect, a computer-implemented method for detecting comprised automated teller machines (ATMs) using an activity monitoring (AM) computing device is provided. The method includes receiving, by the AM computing device, activity data from an ATM. Activity data includes user input data and machine data, wherein user input data includes instructions input by a user at the ATM during a transaction, and wherein machine data is associated with processes performed by the ATM. The method also includes storing operating parameter rules in the memory. The operating parameter rules are configured to indicate whether the received activity data is within a normal activity range for the ATM. The method further includes applying the received activity data to the operating parameter rules. The method also includes generating an activity score for the ATM based on the applying. The activity score is configured to indicate a likelihood that the ATM is compromised. The method still further includes initiating a response based on the activity score.

In another aspect, a computer system for detecting comprised automated teller machines (ATMs) is provided. The computer system comprises a memory and an activity monitoring computer device including a processor. The processor is configured to receive activity data from an ATM. Activity data includes user input data and machine data, wherein user input data includes instructions input by a user at the ATM during a transaction, and wherein machine data is associated with processes performed by the ATM. The processor is further configured to store operating parameter rules in the memory. The operating parameter rules are configured to indicate whether the received activity data is within a normal activity range for the ATM. The processor is also configured to apply the received activity data to the operating parameter rules. The processor is still further configured to generate an activity score for the ATM based on the application, wherein the activity score is configured to indicate a likelihood that the ATM has been compromised. The processor is also configured to initiate a response based on the activity score.

In yet another aspect, at least one non-transitory computer-readable storage media having computer-executable instructions embodied thereon for detecting a compromised automated teller machine (ATM) is provided. When executed by at least one processor coupled to at least one memory device, the computer-executable instructions cause the processor to receive activity data from an ATM. Activity data includes user input data and machine data, wherein user input data includes instructions input by a user at the ATM during a transaction, and wherein machine data is associated with processes performed by the ATM. The computer-executable instructions also cause the processor to store operating parameter rules in the memory. The operating parameter rules are configured to indicate whether the received activity data is within a normal activity range for the ATM. The computer-executable instructions further cause the processor to apply the received activity data to the operating parameter rules. The computer-executable instructions also cause the processor to generate an activity score for the ATM based on the application. The activity score is configured to indicate a likelihood that the ATM is compromised. The computer-executable instructions still further cause the processor to initiate a response based on the activity score.

BRIEF DESCRIPTION OF THE DRAWINGS

FIGS. 1-7 show example embodiments of the methods and systems described herein.

Like numbers in the Figures indicate the same or functionally similar components.

DETAILED DESCRIPTION OF THE DISCLOSURE

The compromise detection system described herein includes an activity monitoring (AM) computing device in communication with at least one automated teller machine (ATM). The compromise detection system is configured to receive activity data from the at least one ATM and to apply the received activity data to operating parameter rules. The operating parameter rules are configured to indicate whether the activity data is within a normal activity range (e.g., whether user input is normal and/or whether machine processes of the ATM are normal). The compromise detection system is further configured to generate an activity score for the ATM, indicating whether or not the ATM is likely compromised.

More specifically, in the example embodiment, the AM computing device is configured to receive the activity data from the ATM. The ATM includes computer hardware and software components configured to prompt a user to enter instructions (e.g., input), receive the instructions from the user of the ATM, and process the instructions to carry out a transaction (e.g., a withdrawal or any other transaction) for the user. The activity data received from the ATM includes user input data and machine data. The user input data includes the instructions input by the user at the ATM during the transaction initiated at the ATM. The machine data is associated with the processes and operations performed by the ATM.

The AM computing device stores operating parameter rules in a memory. In some embodiments, the AM computing device generates the operating parameter rules using statistical modelling and known compromised and/or normal activity data for ATMs. In other embodiments, the AM computing device receives the operating parameter rules. The AM computing device applies the received activity data to the operating parameter rules to generate an activity score for the ATM. The activity score is configured to indicate a likelihood that the ATM is compromised. In other words, if the received activity data is applied to the operating parameter rules and is found to be inside the normal activity range, the AM computing device is configured to generate an activity score that indicates the ATM is likely uncompromised. If the activity data is found to be outside the normal activity range, the AM computing device is configured to generate an activity score that indicates the ATM is likely compromised.

In some embodiments, based on the activity score (i.e., the likelihood that the ATM is compromised), the AM computing device is configured to initiate a response. For example, the AM computing device may generate an alert for a manual investigation of the ATM. The AM computing device may initiate a virus scan at the ATM (by transmitting a virus scan signal to the ATM), in order to potentially identify unauthorized software present on the ATM. The AM computing device may initiate a shutdown of the ATM (by transmitting a shutdown signal to the ATM), which takes the ATM offline until a manual investigation of the ATM can be performed. As used herein, "manual investigation" refers generally to an investigation or examination of the ATM performed in person at the ATM by, for example, an ATM technician. The AM computing device may transmit a command to maintain operation, if the activity score indicates that the ATM is likely uncompromised.

Cardholders (e.g., consumers having one or more financial transaction cards) initiate transactions (e.g., withdrawals) at an ATM. The ATM collects transaction data about each initiated transaction. For example, the ATM collects data about the user input to the ATM, including instructions from the user related to the transaction. The ATM also collects data about the processes and operations the ATM performs, both in response to user input and as part of its normal function. The AM computing device is configured to receive the activity data from the ATM, wherein the activity data includes some user input data (e.g., data related to a user-initiated transaction) and some machine data (e.g., related to processes and operations of the ATM).

Generally, "activity data" is used herein to refer to user input data and machine data collected at the ATM. The AM computing device analyzes the activity data to determine whether the ATM has been compromised by unauthorized software (e.g., malware). If a criminal has installed or otherwise transferred unauthorized software to the ATM, the AM computing device may identify some or all of the activity data as being outside of a normal activity range. Activity data includes user input data and machine data. User input data includes, for example, transaction data such as a transaction amount, a cardholder identifier that associates the user with a respective cardholder account, and a time and/or date stamp. User input data may also include, for example, a transaction type (e.g., withdrawal, bill payment, etc.). Machine data may include, for example, cash output from or cash inventory of the ATM.

In one embodiment of the compromise detection system described herein, the AM computing device is configured to identify a particular cash output without a respective transaction initiated by a user. For example, if unauthorized software is installed on an ATM (i.e., the ATM is compromised), a criminal agent may be able to enter a predetermined code into the ATM. That predetermined code is not associated with any user account but communicates a cash withdrawal request to the ATM. Thus, there occurs a cash output from the ATM without a respective cardholder transaction. Activity data associated with a cash output without a user-initiated transaction, when applied to the operating parameter rules by the AM computing device, may fall outside the normal activity range. The AM computing device may then adjust the generated activity score to indicate a greater likelihood that the ATM is compromised. The AM computing device may be configured to identify cash output or inventory totals that do not match associated user input data. For example, user input data may identify user input for withdrawals totaling $100 for a particular period of time, but cash output or inventory data may identify actual cash output totaling $1000. The AM computing device is configured to apply this user input data and associated machine data (e.g., cash output or cash inventory) to the operating parameter rules and may determine that the user input data falls outside the normal activity range. The AM computing device may then adjust the generated activity score to indicate a greater likelihood that the ATM is compromised.

User input data may also include, for example, transaction velocity data. For transaction velocity data that indicates repetitive transactions initiated within a very short period of time (e.g., multiple transactions within a few seconds), the AM computing device is configured to apply the user input data to the operating parameter rules and may determine that the user input data falls outside the normal activity range. The AM computing device may then adjust the generated activity score to indicate a greater likelihood that the ATM is compromised.

Machine data may also include, for example, virus scan data, reboot data, presence of attached physical media, available memory, critical system data, and other event data. In some cases, a virus scan run at the ATM may return suspicious files and/or software. The ATM may record an unexpected reboot that originates from a source other than a primary hard drive of the ATM. Such a reboot may be indicative of an installation or transfer of unauthorized software to the ATM. The presence of attached physical media (e.g., a USB device or a CD-ROM device) may indicate the transfer of unauthorized software to the ATM. An unexpected drop in available memory of the ATM may indicate the presence of unauthorized software. An interruption in, disruption of, deletion of, or other unexpected change in critical system functionality (e.g., functionality of a remote monitoring system) may indicate the transfer or presence of unauthorized software. Other unexpected or previously unencountered events may also indicate the presence of authorized software. Any or all of these examples, if identified in the received activity data when the activity data is applied to the operating parameter rules by the AM computing device, may fall outside of the normal activity range. The AM computing device may, in any or all of these cases, adjust the generated activity score to indicate a greater likelihood that the ATM is compromised.

The AM computing device may further be configured to take into account physical attributes of the ATM when generating an activity score for the ATM. Physical attributes of the ATM are associated with at least the location of the ATM and may include, for example, a location identifier for the ATM (e.g., an address or location description) and/or user traffic at the ATM. An ATM with high user traffic may be more likely to be a target. An ATM in a publicly accessible location may be more easily compromised. Therefore, the AM computing device may generate an ATM profile for the ATM that includes the physical attributes.

The AM computing device of the example compromise detection system may be in communication with an ATM network. The ATM network may be engaged by or may be otherwise in communication with a host bank, which is associated with the ATM (and, in some cases, a plurality of ATMs). The ATM network is configured to monitor the ATM and/or to process transactions performed at the ATM. In some cases, the host bank is also an issuer bank of transaction cards. The ATM network may be a payment processing network associated with the transaction cards issued by the host bank. If a transaction is initiated at the ATM by a cardholder having a transaction card associated with the host bank (and, therefore, associated with the ATM network), the ATM network may process the transaction using its own payment processing network infrastructure. If a transaction is initiated at the ATM by a cardholder having a transaction card associated with a different payment processing network (other than the payment processing network of the ATM network), the ATM network may submit the transaction to the different payment processing network. The different payment processing network then proceeds with an authorization process with an issuer bank of the transaction card. The compromise detection system may be associated with one or more of the host bank, the ATM network, and a payment processing network.

In some embodiments, the AM computing device may be configured to receive activity data from a second ATM, wherein the second ATM is associated with at least one of a host bank and a second ATM network (i.e., a different ATM network than the ATM network with which the first ATM and/or the AM computing device may be associated). The AM computing device may also be configured to receive a status indicator regarding the second ATM, wherein the status indicator indicates whether the second ATM is compromised or uncompromised. The AM computing device may receive the status indicator from the second ATM and/or from the second host bank. The AM computing device may be configured to generate updated operating parameter rules based on the received activity data from the second ATM and the received status indicator. In other words, the AM computing device uses information gathered from the activity data and status indicator of the second ATM to clarify, update, revise, and/or further define the operating parameter rules that it uses to determine whether any other ATM is or is not comprised. The AM computing device may further be configured to apply activity data from the first ATM to the updated operating parameter rules and to generate an updated activity score for the first ATM.

At least one of the technical problems addressed by this system includes: (i) monitoring machine data from an ATM without associated user input data; (ii) slow response times after a compromised ATM has been detected; and (iii) inefficient or ineffective ATM system management.

The technical effect of the disclosure is achieved by performing at least one of the following steps: (i) receiving, by the AM computing device, activity data from an ATM, activity data including user input data and machine data, wherein user input data includes instructions input by a user at the ATM during a transaction, and wherein machine data is associated with processes performed by the ATM; (ii) storing operating parameter rules in the memory, the operating parameter rules configured to indicate whether the received activity data is within a normal activity range for the ATM; (iii) applying the received activity data to the operating parameter rules; (iv) generating an activity score for the ATM based on the applying, wherein the activity score is configured to indicate a likelihood that the ATM is compromised; and (v) initiating a response based on the activity score.

The technical effect achieved by this system is at least one of: (i) leveraging the combination of user input data and machine data from the ATM to more effectively monitor the ATM; (ii) increased speed and efficiency in responding to compromised ATMs; and (iii) improved ATM system management.

The following detailed description illustrates embodiments of the disclosure by way of example and not by way of limitation. It is contemplated that the embodiments have general application to processing financial transaction data and remote sensing data by a third party in industrial, commercial, and residential applications.

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
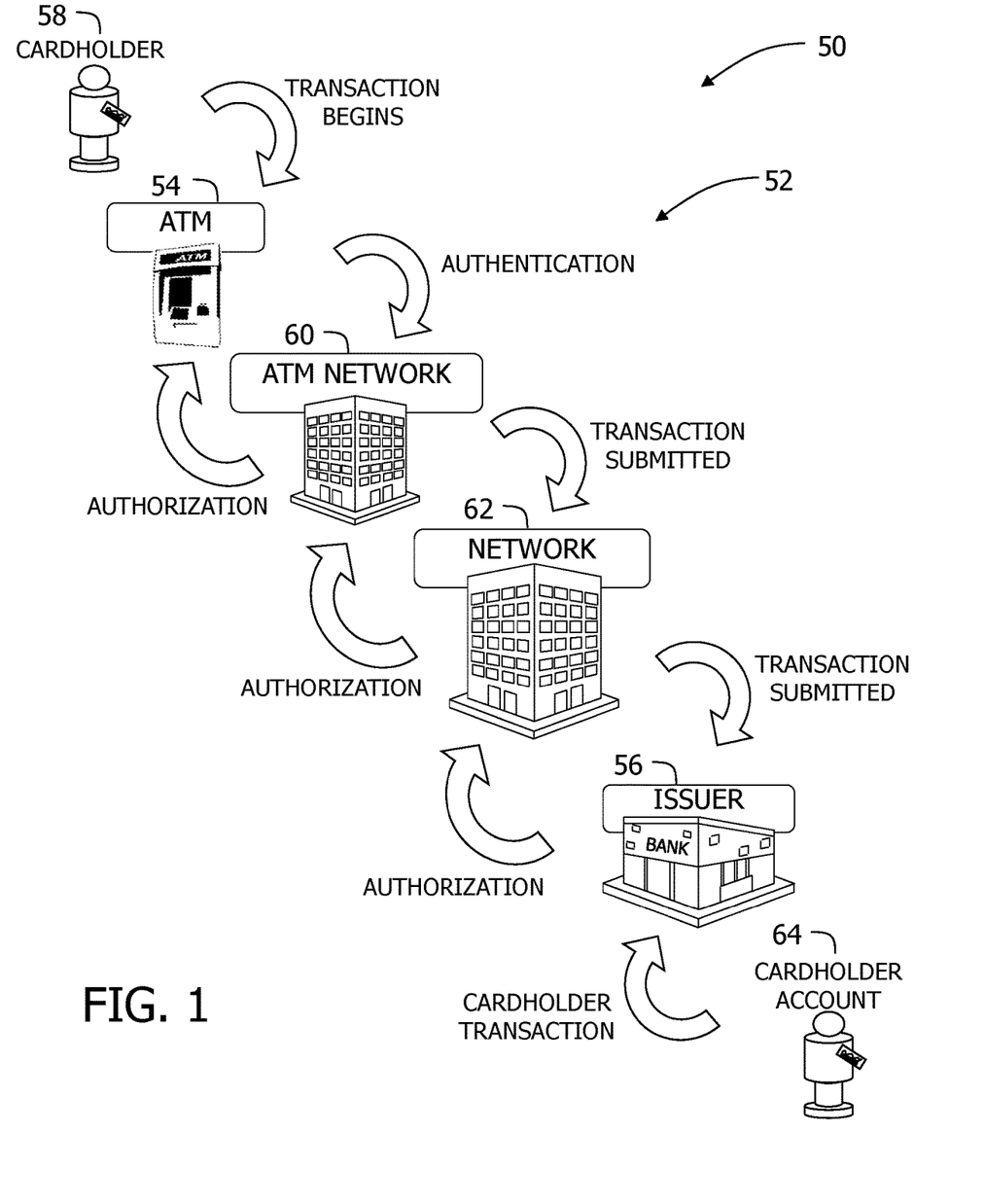
FIG. 1 is a schematic diagram illustrating an example automated teller machine (ATM) system for enabling transaction card transactions at an ATM in accordance with one embodiment of the present disclosure.

FIG. 1 is a schematic diagram 50 illustrating an example automated teller machine (ATM) system 52 for enabling cardholder 58 transactions at an ATM 54. "User," "consumer," and "cardholder" are used interchangeably herein to refer to consumers having a transaction card and/or initiating transaction(s) at ATM 54. ATM system 52 may utilize a variety of different types of transaction cards offered by the consumer for the transaction. Transaction cards can refer to, for example, credit cards, debit cards, and prepaid cards. These cards can all be used as a method for performing a transaction. As described herein, the term "transaction card" or "financial transaction card" includes cards such as credit cards, debit cards, and prepaid cards, but also includes any other devices that may hold payment account information, such as mobile phones, personal digital assistants (PDAs), and key fobs.

In ATM system 52, a financial institution called an "issuer" 56 issues a transaction card, such as a credit card or debit card, to a cardholder 58, who uses the transaction card to initiate a transaction (e.g., a withdrawal) from ATM 54. Generally, ATM 54 is associated with a host bank (not shown). In some cases, issuer bank 56 of the cardholder's transaction card is also the host bank of ATM 54. In some cases, issuer bank 56 and the host bank are separate entities. The host bank may monitor and/or service ATM 54 and process transactions initiated at ATM 54. The host bank may alternatively contract with a third party to monitor and/or service ATM 54. In the example embodiment, the host bank of ATM 54 has engaged with an ATM network 60. ATM network 60 monitors ATM 54 and a plurality of other ATMs (not shown) that may be associated with the host bank or another host bank (not shown). When cardholder 58 initiates a transaction, ATM 54 reads transaction card identification information from, for example, a magnetic stripe on the transaction card or a wireless communication device within the transaction card, and communicates electronically with ATM network 60. ATM network 60 is configured to route the transaction to an interchange network 62 to enable authorization of the transaction.

In some embodiments, ATM network 60 is integral to or otherwise associated with interchange network 62. In other embodiments, ATM network 60 is not associated with interchange network 62. Using interchange network 62, the computers of ATM network 60 will communicate with the computers of issuer bank 56 to determine whether the cardholder's account 64 is eligible to complete the transaction (e.g., has available funds). Based on these determinations, the request for authorization will be declined or accepted. If the request for authorization is accepted, an authorization code is issued to ATM 54 via an authorization response message.

For debit card transactions, when a request for a personal identification number (PIN) authorization is approved by issuer bank 56, cardholder's account 64 is decreased by the amount of the transaction. In some cases, there is an additional fee charged to cardholder's account 64 for use of ATM 54. For example, if the transaction card used by cardholder 58 is not affiliated with ATM 54 or the host bank of ATM 54, there may be a small fee charged for the use of ATM 54. In other cases, for example, if the transaction card used by cardholder 58 is associated with either or both of ATM 54 and the host bank of ATM 54, the fee may be waived or refunded to cardholder 58. Normally, a transaction charge associated with the transaction is posted immediately to cardholder's account 64. Interchange network 62 then transmits the approval in the authorization response message to ATM network 60. ATM network 60 transmits the approval to ATM 54. If, for example, the transaction initiated by cardholder 58 was a withdrawal, the authorization response message transmitted to ATM 54 includes instructions for ATM 54 to distribute cash to cardholder 58. In the example embodiment, an activity monitoring computing device (shown in FIG. 2) may be in communication with or be a part of ATM network 60.

Figure 2:
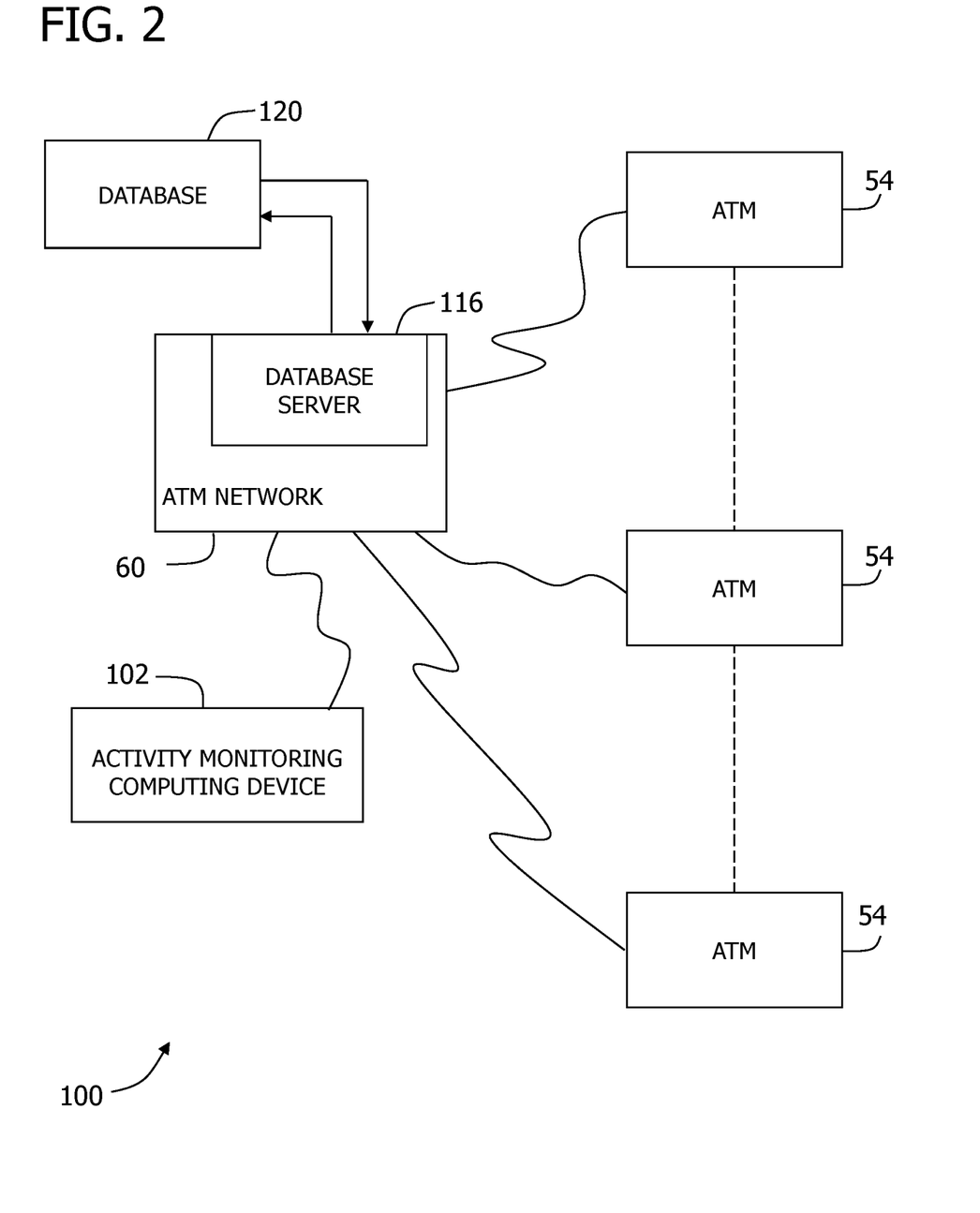
FIG. 2 is a simplified block diagram of an example compromise detection system that may be used to analyze activity data from an ATM shown in FIG. 1 to determine whether the ATM is compromised.

FIG. 2 is a simplified block diagram of an example compromise detection system 100 that may be used to analyze activity data from ATMs 54 (shown in FIG. 1) to determine whether any of ATMs 54 are compromised. In the example embodiment, system 100 includes a plurality of computer devices. More specifically, in the example embodiment, system 100 includes an activity monitoring (AM) computing device 102. AM computing device 102 is communicatively coupled to ATM network 60 (shown in FIG. 1).

Compromise detection system 100 further includes a plurality of ATMs 54 that are communicatively coupled to ATM network 60. In one embodiment, an ATM 54 includes a computer that includes a memory device and a wired and/or wireless communication device, such that ATMs 54 are accessible to ATM network 60 via the Internet. In the example embodiment, ATMs 54 may be interconnected to the Internet through, for example, a network, such as a local area network (LAN) or a wide area network (WAN), dial-in connections, cable modems, and/or special high-speed ISDN lines. ATMs 54 further include hardware and/or software configured to read information from a cardholder's transaction card.

In the example embodiment, each ATM 54 collects activity data. ATMs 54 may store activity data and send the activity data at a particular time or at specific intervals to AM computing device 102. ATMs 54 may send activity data to AM computing device 102 in "real-time," and AM computing device 102 may store activity data. ATMs 54 communicate the activity data to AM computing device 102 via a communication link such as, for example, a wired and/or wireless network, a satellite network, radio, 3G, and/or 4G. ATMs 54 may also be configured to send physical attributes associated with at least a location of ATMs 54 to AM computing device 102.

A database server 116 is coupled to a database 120 that contains and stores information on a variety of matters, as described in further detail below. For example, AM computing device 102 or ATM network 60 may store received activity data and/or ATM physical attributes in database 120.

Database 120 may also store operating parameter rules used by AM computing device 102. In one embodiment, centralized database 120 is stored on ATM network 60 and can be selectively accessed by AM computing device 102 and/or by users by logging onto AM computing device 102 or ATM network 60. In alternative embodiments, database 120 may be stored remotely from AM computing device 102 and/or ATM network 60 and may be non-centralized.

In the example embodiment, AM computing device 102 receives activity data from ATMs 54. AM computing device 102 may process and/or combine data in the received activity data with data from additional databases (not shown in FIG. 2). The additional databases may include, but are not limited to, activity data from: ATMs hosted by another host bank, ATMs associated with another ATM network, and known compromised ATMs. AM computing device 102 may use this additional activity data to generate updated operating parameter rules. For example, AM computing device 102 may use activity data from a known normal ATM to define a normal activity range. The term "normal activity range" is used herein to refer generally to known or likely normal activity of the user and ATM 54, wherein "normal" is used generally to mean "uncompromised." As another example, AM computing device 102 may use activity data from known compromised ATMs to define a "compromised activity range" outside of the normal activity range.

Figure 3:
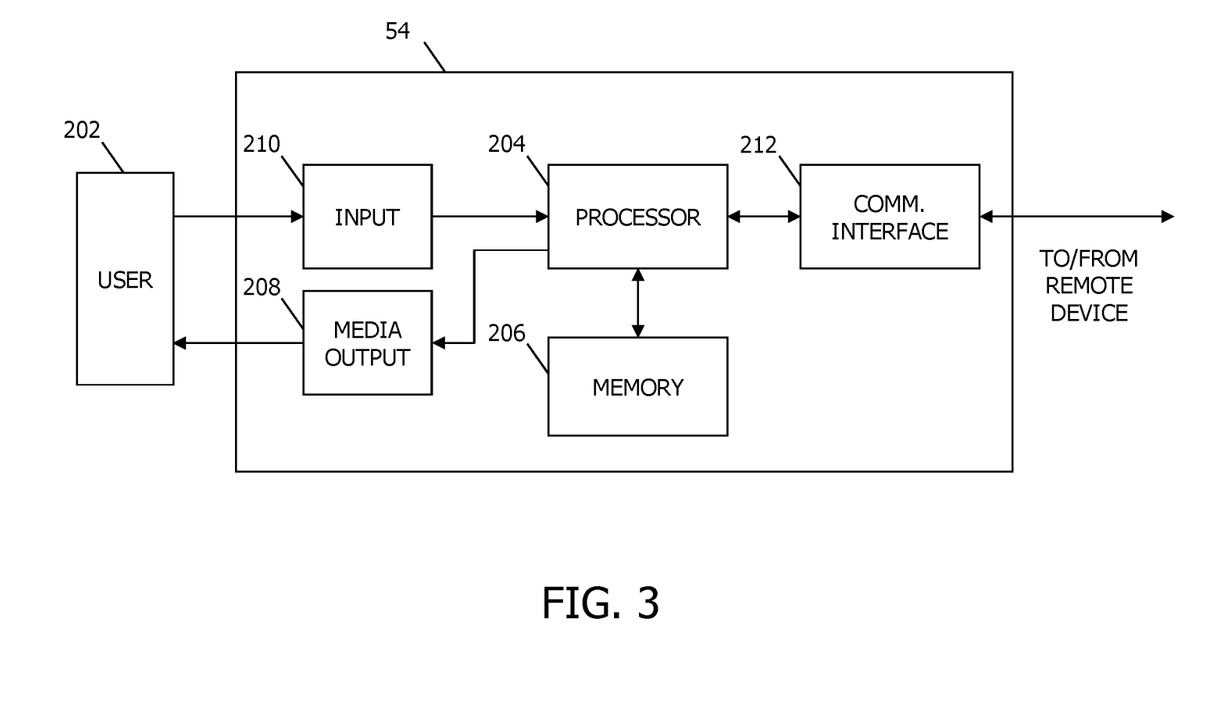
FIG. 3 illustrates an example configuration of an ATM operated by a user to initiate a transaction using the system shown in FIG. 1.

FIG. 3 illustrates an example configuration of ATM 54 (shown in FIG. 2) operated by a user 202 (e.g., cardholder 58, shown in FIG. 1), for example, to initiate a transaction using a transaction card. ATM 54 includes a processor 204 for executing instructions. In some embodiments, executable instructions are stored in a memory area 206. Processor 204 may include one or more processing units (e.g., in a multi-core configuration). ATM 54 also includes memory area 206, which is any device allowing information such as computer-executable instructions and/or written works to be stored and retrieved. Memory area 206 may include one or more computer-readable media.

ATM 54 also includes at least one media output component 208 for presenting information to user 202. Media output component 208 is any component capable of conveying information to user 202. In some embodiments, media output component 208 includes an output adapter such as a video adapter and/or an audio adapter (not shown). An output adapter is operatively coupled to processor 204 and operatively couplable to an output device such as a display device (e.g., a liquid crystal display (LCD), organic light emitting diode (OLED) display, or "electronic ink" display) or an audio output device (e.g., a speaker or headphones).

In some embodiments, ATM 54 includes an input device 210 for receiving input (e.g., instructions) from user 202. Input device 210 may include, for example, a keyboard, a pointing device, a mouse, a stylus, a touch-sensitive panel (e.g., a touch pad or a touch screen), a position detector, or an audio input device. Input device 210 also includes a card reader for reading information from a transaction card of user 202. For example, the input device 210 may include a magnetic stripe reader, a radio frequency identification (RFID) system, a near-field communication (NFC) system, or any other suitable communication system that allows ATM 54 to read information from the transaction card. A single component such as a touch screen may function as both an output device of media output component 208 and input device 210.

Stored in memory area 206 are, for example, computer-readable instructions for providing a user interface to user 202 via media output component 208 and, optionally, receiving and processing input from input device 210. A user interface may include, among other possibilities, a web browser and client application. Web browsers enable users, such as user 202, to display and interact with media and other information typically embedded on a web page or a website from ATM network 60. A client application allows user 202 to interact with a server application from ATM network 60.

ATM 54 may also include a communication interface 212, which is communicatively couplable to a remote device such as ATM network 60 (shown in FIG. 1) and/or AM computing device 102 (shown in FIG. 2). Communication interface 212 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Figure 4:
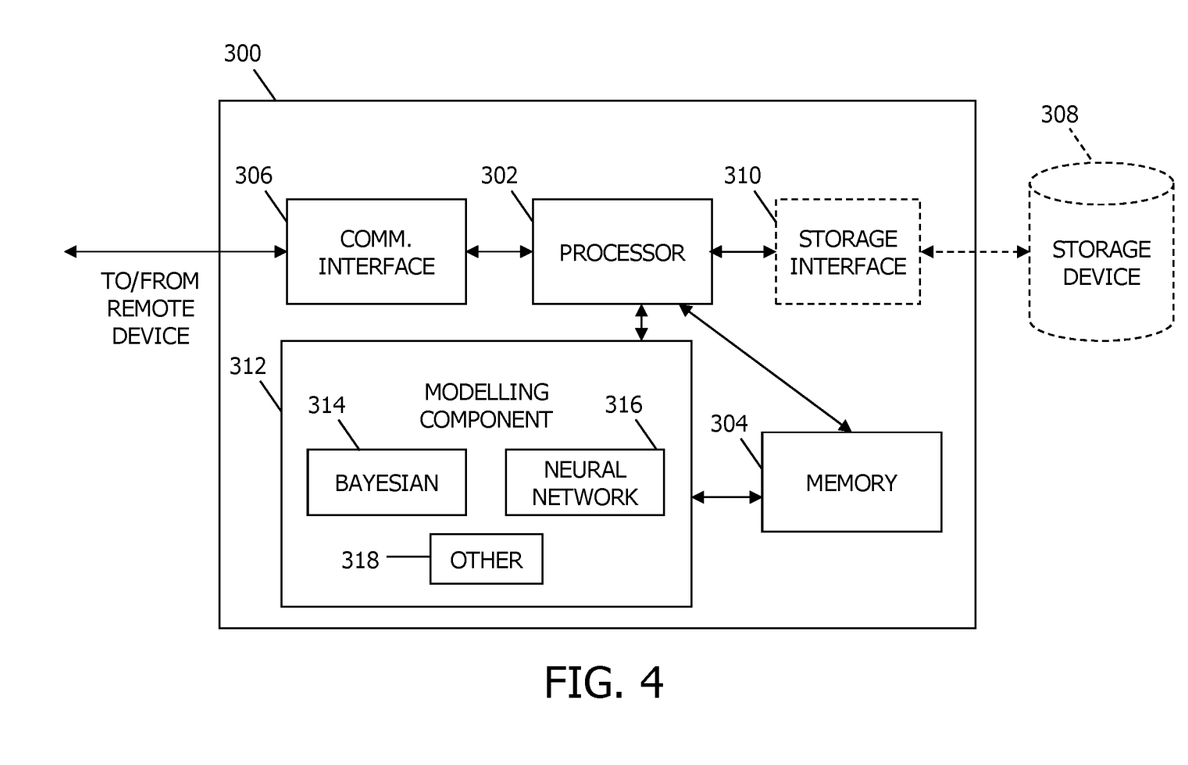
FIG. 4 illustrates an example configuration of a server system shown in FIG. 2.

FIG. 4 illustrates an example configuration of a server computing device 300 that may be used as part of compromise detection system 100 (shown in FIG. 2). Server computing device 300 may include, but is not limited to, ATM network 60 (shown in FIG. 1), AM computing device 102, database server 116 (both shown in FIG. 2), and any other computing device configured to function as described herein.

Server computing device 300 includes a processor 302 for executing instructions. Instructions may be stored in a memory area 304, for example. Processor 302 may include one or more processing units (e.g., in a multicore configuration). Processor 302 is operatively coupled to a communication interface 306 such that server computing device 300 is capable of communicating with a remote device such as ATM 54 (shown in FIG. 1) or another server computing device 300. For example, communication interface 306 may receive requests from a user (e.g., user 202) or from a remote device (e.g., ATM 54) via the Internet.

Processor 302 may also be operatively coupled to storage device 308. Storage device 308 is any computer-operated hardware suitable for storing and/or retrieving data. In some embodiments, storage device 308 is integrated in server computing device 300. For example, server computing device 300 may include one or more hard disk drives as storage device 308. In other embodiments, storage device 308 is external to server computing device 300 and may be accessed by a plurality of server computing devices 300. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some embodiments, processor 302 is operatively coupled to storage device 308 via a storage interface 310. Storage interface 310 is any component capable of providing processor 302 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 308.

In the example embodiment, server computing device 300 (e.g., AM computing device 102) includes a modelling component 312. Modelling component 312 includes computer-executable instructions for applying activity data (received from an ATM) to operating parameter rules, using statistical modelling. Modelling component 312 includes computer-executable instructions for using at least a machine learning algorithm. Some machine learning algorithms used by the modelling component 312 may include artificial neural networks 314 and Bayesian statistics 316. Other machine learning models 318 used by modelling component 312 may include, for example, decision trees, inductive logic, learning vector quantization, ordinal classification, and information fuzzy networks (IFN). Server computing device 300 may store the operating parameter rules in one or both of memory 304 and storage device 308. Modelling component 312 may be configured to generate the operating parameter rules using received known normal activity data and/or received known compromised activity data.

Figure 5:
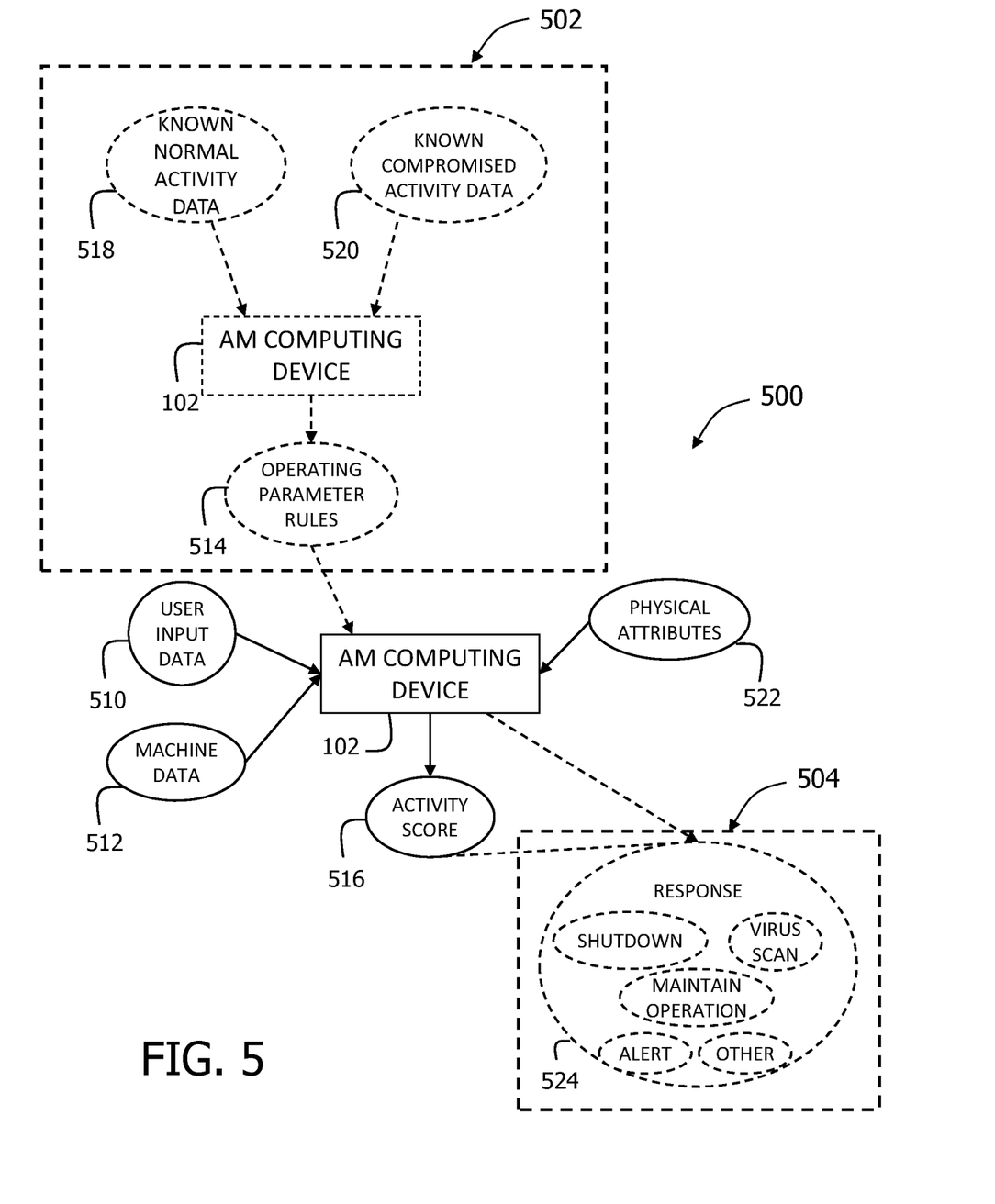
FIG. 5 is a table displaying example scoring rules that may be applied by the activity monitoring computing device shown in FIG. 2.

FIG. 5 is a data flow diagram 500 showing the flow of data to and from an example activity monitoring (AM) computing device 102 (shown in FIG. 2). In the illustrated embodiment, AM computing device 102 receives user input data 510 and machine data 512 (collectively "activity data") from an ATM (not shown). AM computing device 102 is configured to apply received activity data 510, 512 to operating parameter rules 514.

AM computing device 102 is configured to store operating parameter rules 514 in a memory (not shown). In some embodiments, as illustrated in data sub-flow 502, AM computing device 102 is configured to generate the operating parameter rules 514. In these embodiments, AM computing device 102 receives at least one of known normal activity data 518 and known compromised activity data 520. AM computing device 102 uses statistical modelling to generate the operating parameter rules 514 based on known normal activity data 518 and/or known compromised activity data 520. For example, AM computing device 102 may use known normal activity data 518 to define a normal activity range. As another example, AM computing device 102 may use known compromised activity data 520 to define a compromised activity range, which falls outside of the normal activity range. Generally, operating parameter rules 514 are generated in order to indicate whether received activity data falls within the normal activity range.

In some embodiments, some of operating parameter rules 514 (whether generated or received by AM computing device 102) may be configured to identify a particular combination of received activity data 510, 512 that indicates a particularly high likelihood of the ATM being compromised. For example, an operating parameter rule 514 may be configured to indicate that a combination of reboot data, presence of attached physical media, and available memory falling outside of the normal activity range indicates a particularly high likelihood of the ATM being compromised. In some embodiments, an operating parameter rule 514 may be configured to indicate that a certain number of applied activity data falling outside of the normal activity range (i.e., not falling within the normal activity range) indicates a particularly high likelihood of the ATM being compromised. For example, an operating parameter rule 514 may be configured to indicate that five or greater instances of activity data not falling within the normal activity range indicates a particularly high likelihood that the ATM is compromised. Operating parameter rules 514 may include any other rules, which may take into account any number, combination, variation, weight, or any other variable of any activity data and/or activity range.

AM computing device 102 may then apply received activity data 510, 512 to stored (and/or generated) operating parameter rules 514. Based on the applying, AM computing device 102 is configured to generate an activity score 516, which is indicates a likelihood that that ATM is compromised. In some embodiments, a higher activity score 516 represents a higher likelihood that the ATM is compromised. In other embodiments, a lower activity score 516 represents a higher likelihood that the ATM is compromised. In still other embodiments, an activity score 516 falling within one or more particular range(s) indicates a respective likelihood that the ATM is compromised.

In some embodiments, AM computing device 102 may be configured to receive physical attributes 522 of an ATM, wherein physical attributes 522 are associated at least with a location of the ATM. For example, physical attributes 522 may include a location identifier of the ATM, a public accessibility of the ATM, and/or user traffic at the ATM. Physical attributes 522 may affect the likelihood that the ATM may be a target for being compromised. For example, an ATM with high user traffic or an easily accessible location may indicate an ATM that is more likely to be compromised. AM computing device 102 may develop an ATM profile of the ATM based on physical attributes 522. AM computing device 102 may use the ATM profile to generate or update activity score 516 for the ATM.

In some embodiments, as illustrated in data sub-flow 504, AM computing device 102 may be configured to initiate a response 524 based on activity score 516. Response 524 may include at least one of a shutdown of the ATM (initiated by transmitting a shutdown signal to the ATM), a virus scan at the ATM (initiated by transmitting a virus scan signal to the ATM), a generated alert for a manual investigation of the ATM (by transmitting an alert signal), or any other response. Response 524 may, if activity score indicates a low likelihood that the ATM is compromised, include a command to maintain operation of the ATM (e.g., an "OK" message). Response 524 may be initiated if, for example, activity score 516 exceeds or is less than a particular threshold. Response 524 may be initiated if activity score 516 falls within a particular range. In some embodiments, the particular response 524 initiated (e.g., alert as opposed to shutdown; or virus scan, alert, and shutdown; or maintain operation) is based on the particular activity score 516.

Figure 6:
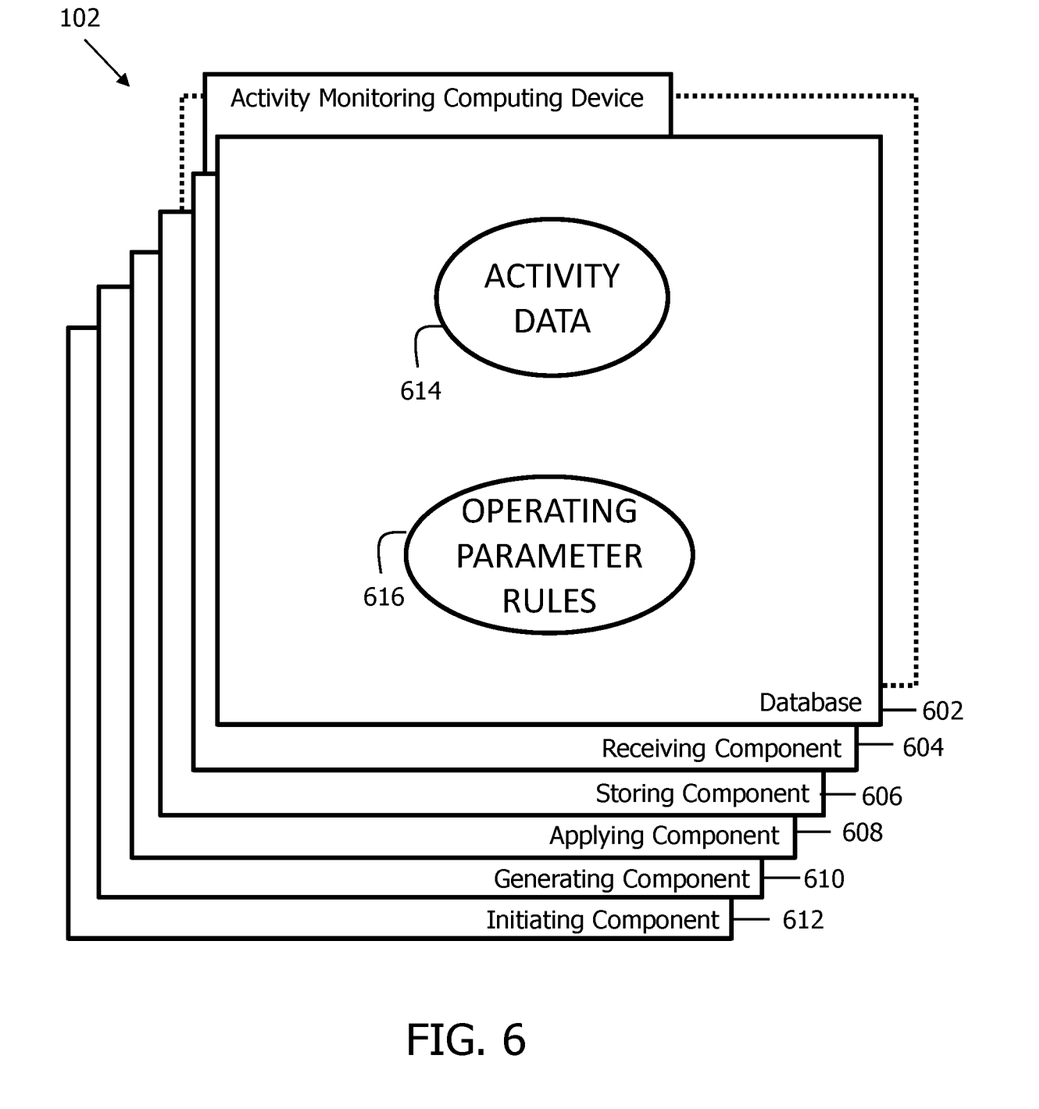
FIG. 6 is a component view of an example activity monitoring computing device shown in FIG. 2.

FIG. 6 is a component view of an example activity monitoring (AM) computing device 102, as shown in FIG. 2. In the example embodiment, AM computing device 102 includes a database 602. Database 602 stores, for example, activity data 614 received from an ATM (e.g., ATM 54, shown in FIG. 1). Database 602 may further store operating parameter rules 616.

In the example embodiment, AM computing device 102 further includes a receiving component 604 for receiving activity data 614 from ATM 54, wherein activity data 614 includes user input data and machine data. Receiving component 604 may also receive activity data from a second ATM (not shown), wherein the second ATM is at least one of a second ATM associated with a second host bank, wherein the second host bank is in communication with a second ATM network, and a second ATM that is a known compromised ATM. Receiving component may also receive a status indicator for the second ATM, which indicates whether the second ATM is compromised or uncompromised. AM computing device 102 further includes a storing component 604 for storing received activity data 614 in database 602. Storing component 604 may also store received and/or generated operating parameter rules 616 in database 602.

AM computing device 102 further includes an applying component 608 for applying activity data 614 to operating parameter rules 616. In the example embodiment, applying component 608 includes modelling component 312 (not shown in FIG. 6) as described with respect to FIG. 4. Applying component 608, including modelling component 312, may be configured to generate operating parameter rules 616. In some embodiments, applying component 608, including modelling component 312, may further be configured to generate updated operating parameter rules based on activity data received from the second ATM and the status indicator associated with the second ATM.

AM computing device 102 further includes a generating component 610 for generating an activity score for the ATM based on the output from applying component 608, wherein the activity score is configured to indicate a likelihood that the ATM is compromised. AM computing device further includes an initiating component 612 for initiating a response based on the activity score. In some embodiments, the response includes at least one of a command to maintain operation of the ATM, a virus scan of the ATM, a shutdown of the ATM, and a generated alert for a manual investigation of the ATM.

Figure 7:
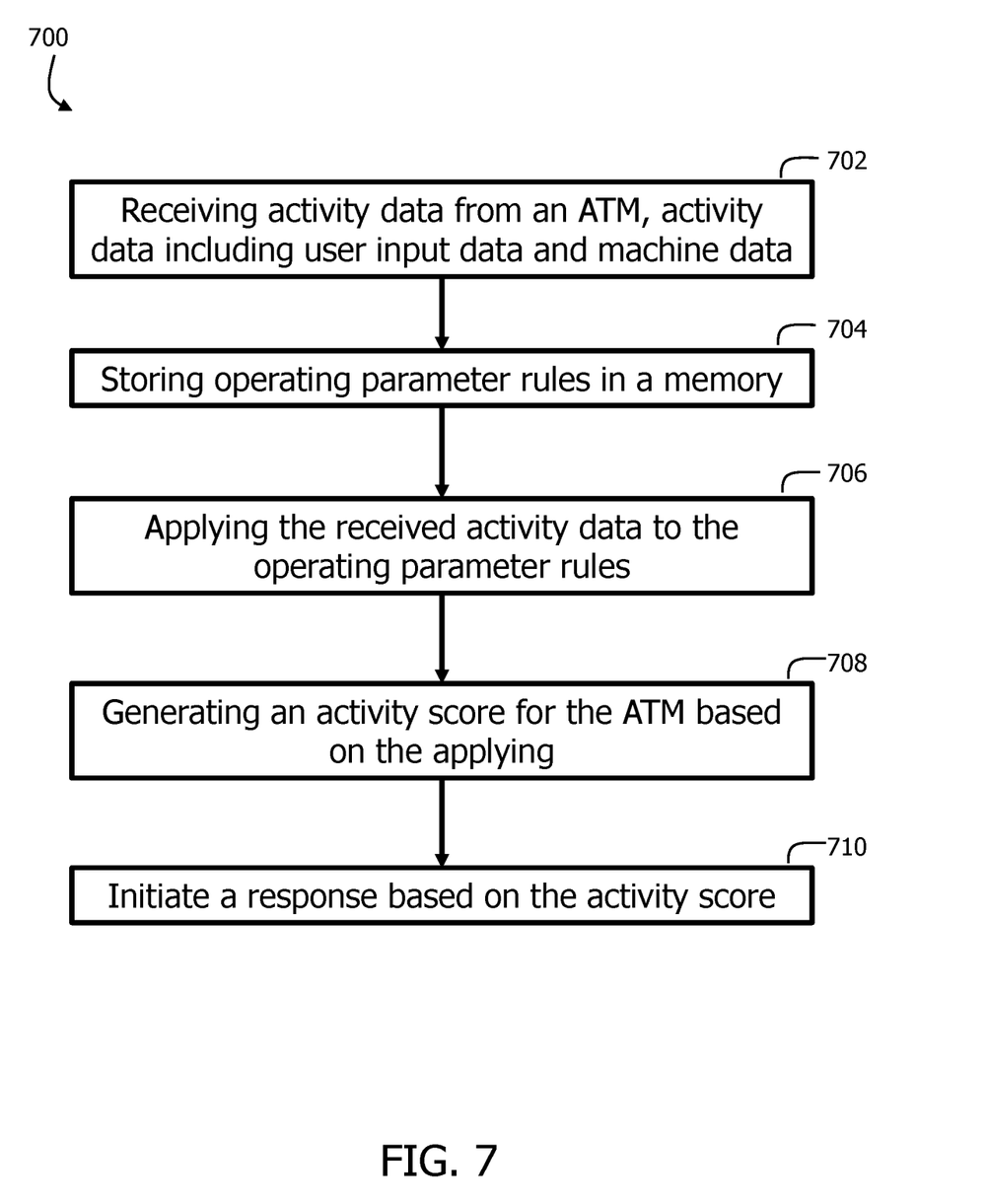
FIG. 7 is a flow diagram of an example method for detecting a compromised ATM implemented by an activity monitoring computing device shown in FIG. 2.

FIG. 7 is a flow diagram of an example method 700 for detecting a compromised ATM. In the example embodiment, method 700 is performed by activity monitoring (AM) computing device 102 (shown in FIG. 2). AM computing device 102 receives 702 activity data from an ATM. Activity data includes user input data and machine data, wherein user input data includes instructions input by a user at the ATM during a transaction and machine data is associated with processes performed by the ATM. AM computing device 102 stores 704 operating parameter rules in the memory, each operating parameter rule configured to indicate whether the received activity data is within a normal activity range. AM computing device 102 further applies 706 the received activity data to the operating parameter rules. AM computing device 102 also generates 708 an activity score for the ATM based on the applying 706, wherein the activity score is configured to indicate a likelihood that the ATM is compromised. AM computing device 102 also initiates 710 a response based on the activity score.

As will be appreciated based on the foregoing specification, the above-described embodiments of the disclosure may be implemented using computer programming or engineering techniques including computer software, firmware, hardware or any combination or subset thereof, wherein the technical effect of the systems and processes described herein is achieved by creating a network-based system for detecting compromised ATMs. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the disclosure, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for detecting a compromised automated teller machine (ATM), the method implemented using an activity monitoring (AM) computing device including a processor and a memory, the method comprising:
   receiving, by the AM computing device at predetermined time intervals, activity data collected by each of a plurality of ATMs, the activity data including a plurality of variables including cash inventory data, reboot data, available memory, user-input transaction amounts, and time stamps of user-initiated transactions;
   continuously updating, by the AM computing device based on the activity data received from a set of the ATMs of the plurality of ATMs, a stored normal activity range of operating parameter rules for the plurality of variables for an ATM of the set of ATMs;
   receiving, by the AM computing device subsequent to at least one updating of the stored normal activity range, current activity data from the ATM;
   applying, by the AM computing device, the received current activity data to the stored normal activity range for the plurality of variables, wherein said applying comprises generating an activity score for the ATM;
   detecting, by the AM computing device, based on the applying, that the ATM is compromised, wherein said detecting comprises detecting the activity score for the ATM falls within a range indicating a high likelihood of compromise; and
   causing, by the AM computing device in response to the detection, the ATM to initiate at least one of a virus scan and a shutdown.

2. The computer-implemented method of claim 1, further comprising transmitting, by the AM computing device, an alert for initiating a manual investigation of the ATM, wherein the alert is transmitted to a user associated with at least one of the ATM, a host bank associated with the ATM, and an ATM network associated with at least one of the ATM and the host bank.

3. A compromise detection computer system for detecting a compromised automated teller machine (ATM), the computer system comprising:
   a memory; and
   an activity monitoring computer device including a processor configured to:
      at predetermined time intervals, receive activity data collected by each of a plurality of ATMs, the activity data including a plurality of variables including cash inventory data, reboot data, available memory, user-input transaction amounts, and time stamps of user-initiated transactions;
      based on the activity data received from a set of the ATMs of the plurality of ATMs, continuously update a stored normal activity range of operating parameter rules for the plurality of variables for an ATM of the set of ATMs;
      subsequent to at least one updating of the stored normal activity range, receive current activity data from the ATM;

apply the received current activity data to the stored normal activity range for the plurality of variables, wherein, to apply the received current activity data to the stored normal activity range, the processor is further configured to generate an activity score for the ATM;

detect, based on the application, that the ATM is compromised, wherein, to detect that the ATM is compromised, the processor is further configured to detect that the activity score for the ATM falls within a range indicating a high likelihood of compromise; and in response to the detection, cause the ATM to initiate at least one of a virus scan and a shutdown.

4. The compromise detection computer system of claim 3, wherein the processor is further configured to transmit an alert for initiating a manual investigation of the ATM, wherein the alert is transmitted to a user associated with at least one of the ATM, a host bank associated with the ATM, and an ATM network associated with at least one of the ATM and the host bank.

5. At least one non-transitory computer-readable storage media having computer-executable instructions embodied thereon for detecting a compromised automated teller machine (ATM), wherein when executed by at least one processor coupled to at least one memory device, the computer-executable instructions cause the processor to:

at predetermined time intervals, receive activity data collected by each of a plurality of ATMs, the activity data including a plurality of variables including cash inventory data, reboot data, available memory, user-input transaction amounts, and time stamps of user-initiated transactions;

based on the activity data received from a set of ATMs of the plurality of ATMs, continuously update a stored normal activity range of operating parameter rules for the plurality of variables for an ATM of the set of ATMs;

subsequent to at least one updating of the stored normal activity range, receive current activity data from the ATM;

apply the received current activity data to the stored normal activity range for the plurality of variables, wherein, to apply the received current activity data to the stored normal activity range, the computer-executable instructions cause the processor to generate an activity score for the ATM;

detect, based on the application, that the ATM is compromised, wherein, to detect that the ATM is compromised, the computer-executable instructions cause the processor to detect that the activity score for the ATM falls within a range indicating a high likelihood of compromise; and in response to the detection, cause the ATM to initiate at least one of a virus scan and a shutdown.

6. The computer-readable media of claim 5, wherein the computer-executable instructions further cause the processor to transmit an alert for initiating a manual investigation of the ATM, wherein the alert is transmitted to a user associated with at least one of the ATM, a host bank associated with the ATM, and an ATM network associated with at least one of the ATM and the host bank.

7. The computer-implemented method of claim 1, wherein said detecting comprises determining that the received current activity data for at least one of the plurality of variables is outside the stored normal activity range in at least one instance.

8. The computer-implemented method of claim 1, further comprising:

initially determining, by the AM computing device, a normal activity range for the plurality of variables for the ATM based upon known normal activity data and known compromised activity data for one or more of the plurality of ATMS; and storing, by the AM computing device, the normal activity range as the stored normal activity range for the plurality of variables for the ATM.

9. The computer-implemented method of claim 8, wherein the one or more of the plurality of ATMs include ATMs with comparable variables and physical attributes to the ATM.

10. The computer-implemented method of claim 1, wherein said generating comprises applying a plurality of operating parameter rules to the received current activity data, the operating parameter rules defining relative importance of a deviation of one or more of the plurality of variables from the stored normal activity range in one or more instances.

11. The compromise detection computer system of claim 3, wherein, to detect that the ATM is compromised, the processor is further configured to determine that the received current activity data for at least one of the plurality of variables is outside the stored normal activity range in at least one instance.

12. The compromise detection computer system of claim 3, wherein the processor is further configured to:

initially determine a normal activity range for the plurality of variables for the ATM based upon known normal activity data and known compromised activity data for one or more of the plurality of ATMS; and store the normal activity range as the stored normal activity range for the plurality of variables for the ATM.

13. The compromise detection computer system of claim 12, wherein the one or more of the plurality of ATMs include ATMs with comparable variables and physical attributes to the ATM.

14. The compromise detection computer system of claim 3, wherein, to generate the activity score for the ATM, the processor is further configured to apply a plurality of operating parameter rules to the received current activity data, the operating parameter rules defining relative importance of a deviation of one or more of the plurality of-variables from the stored normal activity range in one or more instances.

15. The computer-readable media of claim 5, wherein the computer-executable instructions further cause the processor to detect that the ATM is compromised by determining that the received current activity data for at least one of the plurality of variables is outside the stored normal activity range in at least one instance.

16. The computer-readable media of claim 5, wherein the computer-executable instructions further cause the processor to:

initially determine a normal activity range for the plurality of variables for the ATM based upon known normal activity data and known compromised activity data for one or more of the plurality of ATMS; and store the normal activity range as the stored normal activity range for the plurality of variables for the ATM.

17. The computer-readable media of claim 16, wherein the one or more of the plurality of ATMs include ATMs with comparable variables data and physical attributes to the ATM.

* * * * *